(12) United States Patent
Malik

(10) Patent No.: US 10,520,107 B2
(45) Date of Patent: Dec. 31, 2019

(54) BIASING DEVICE FOR LINKAGE SYSTEM AND METHOD OF MAKING AND USING THE SAME

(71) Applicant: BorgWarner Inc., Auburn Hills, MI (US)

(72) Inventor: Petr Malik, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/586,399

(22) Filed: May 4, 2017

(65) Prior Publication Data

US 2017/0328491 A1    Nov. 16, 2017

Related U.S. Application Data

(60) Provisional application No. 62/336,097, filed on May 13, 2016.

(51) Int. Cl.
*F16K 31/44*    (2006.01)
*F16H 21/44*    (2006.01)
(Continued)

(52) U.S. Cl.
CPC ............ *F16K 31/44* (2013.01); *F02B 37/186* (2013.01); *F16H 21/44* (2013.01); *F16K 1/221* (2013.01);
(Continued)

(58) Field of Classification Search
CPC ...... F16K 31/521; F16K 31/46; F16K 31/043; F16K 31/047; F16K 31/045; F16K 31/048; F16K 31/44; F02B 37/186
See application file for complete search history.

(56) References Cited

U.S. PATENT DOCUMENTS 423,240 A * 3/1890 Graebert ................. F16K 31/44
251/234
506,438 A * 10/1893 Meer ....................... F16K 31/44
251/234

(Continued)

FOREIGN PATENT DOCUMENTS

| CN | 104930205 A | 9/2015 |
| FR | 2706966 A1 | 12/1994 |
| JP | 2008075741 A | 4/2008 |

OTHER PUBLICATIONS

Chinese Office Action dated Aug. 5, 2019; Application No. 201710283187.4; Applicant: BorgWarner Inc.; 15 pages.

*Primary Examiner* — Matthew W Jellett
*Assistant Examiner* — Christopher D Ballman
(74) *Attorney, Agent, or Firm* — BrooksGroup

(57) ABSTRACT

A number of variations may include a product comprising: a linkage system comprising: a first and second lever; a first interconnecting component and second interconnecting component operably connected to the first and second levers; a link bar having a first end with a first opening for receiving the first or second interconnecting component, and providing a clearance between the first opening and the first or second interconnecting component and; a second end with a second opening for receiving the first or second interconnecting component and providing a clearance between the second opening and the first or second interconnecting component; and a biasing device having a first and second end for engagement with the first and second interconnecting components and at least one section to allow for increasing or decreasing its length.

17 Claims, 6 Drawing Sheets

(51) Int. Cl.
*F16K 1/22* (2006.01)
*F02B 37/18* (2006.01)
*F16K 31/46* (2006.01)
*F16K 31/52* (2006.01)
*F16K 31/04* (2006.01)
*F16H 33/02* (2006.01)
*F16H 51/00* (2006.01)

(52) U.S. Cl.
CPC ............ *F16K 31/46* (2013.01); *F16K 31/521* (2013.01); *F16H 33/02* (2013.01); *F16H 51/00* (2013.01); *F16K 31/043* (2013.01); *F16K 31/045* (2013.01); *F16K 31/047* (2013.01); *F16K 31/048* (2013.01); *Y02T 10/144* (2013.01)

(56) References Cited

U.S. PATENT DOCUMENTS

| | | | | |
|---|---|---|---|---|
| 1,656,185 A * | 1/1928 | Enz | F16K 31/043 | 251/120 |
| 1,751,172 A * | 3/1930 | Reinhardt | F16K 31/44 | 200/453 |
| 2,177,354 A * | 10/1939 | Marcus | F16K 31/043 | 237/19 |
| 2,242,676 A * | 5/1941 | Jurs | F16K 31/46 | 60/570 |
| 2,491,380 A * | 12/1949 | Kutzler | F02B 37/183 | 417/21 |
| 2,647,659 A * | 8/1953 | Berck | F16K 31/44 | 137/871 |
| 2,977,085 A * | 3/1961 | Roberts | A47J 31/06 | 251/149.3 |
| 3,094,836 A * | 6/1963 | Powell | F02B 37/18 | 60/598 |
| 3,268,204 A * | 8/1966 | Grove | F16K 31/44 | 251/234 |
| 3,307,583 A * | 3/1967 | Harter | F16K 11/0525 | 137/596 |
| 3,321,990 A * | 5/1967 | Densmore | F15B 13/06 | 137/636.3 |
| 3,380,479 A * | 4/1968 | Bassan | F16K 31/44 | 137/607 |
| 3,395,568 A * | 8/1968 | Lodige | A62B 13/00 | 73/35.17 |
| 3,474,829 A * | 10/1969 | Scheineman | F16K 31/1635 | 137/625.32 |
| 3,633,436 A * | 1/1972 | Freiburger | B62D 11/00 | 180/333 |
| 3,847,373 A * | 11/1974 | Hagar | F16K 1/165 | 251/213 |
| 3,985,042 A * | 10/1976 | Cornu | F16K 31/44 | 74/568 R |
| 4,050,670 A * | 9/1977 | Borg | F16K 31/145 | 251/14 |
| 4,288,060 A * | 9/1981 | Mittell | F16K 31/44 | 251/215 |
| 4,427,026 A * | 1/1984 | Comer, Jr. | B66C 13/56 | 137/556 |
| 4,590,959 A * | 5/1986 | Fort | F16K 27/07 | 137/315.35 |
| 5,007,613 A * | 4/1991 | Barker | F16K 1/221 | 137/270 |
| 5,109,883 A * | 5/1992 | Squirrell | F15B 15/06 | 137/385 |
| 5,299,601 A * | 4/1994 | Koch | F16K 31/521 | 137/875 |
| 5,797,585 A * | 8/1998 | Auvity | F16K 31/521 | 251/229 |
| 5,967,486 A * | 10/1999 | McCrory | F16K 31/163 | 251/232 |
| 6,086,038 A * | 7/2000 | Ma | F16K 31/1635 | 251/232 |
| 8,015,992 B2 * | 9/2011 | Schlienger | F16K 5/14 | 137/319 |
| 8,091,858 B2 * | 1/2012 | Janich | F16K 11/052 | 137/875 |
| 8,491,363 B2 * | 7/2013 | Dirnberger | F16K 31/521 | 454/333 |
| 9,234,455 B2 * | 1/2016 | Fauconnier | F02B 37/186 | |
| 9,243,549 B2 * | 1/2016 | Hinkelmann | F01D 17/105 | |
| 9,821,631 B2 * | 11/2017 | Kim | B60H 1/3421 | |
| 2016/0114654 A1 * | 4/2016 | Lee | B60H 1/3414 | 454/155 |

* cited by examiner

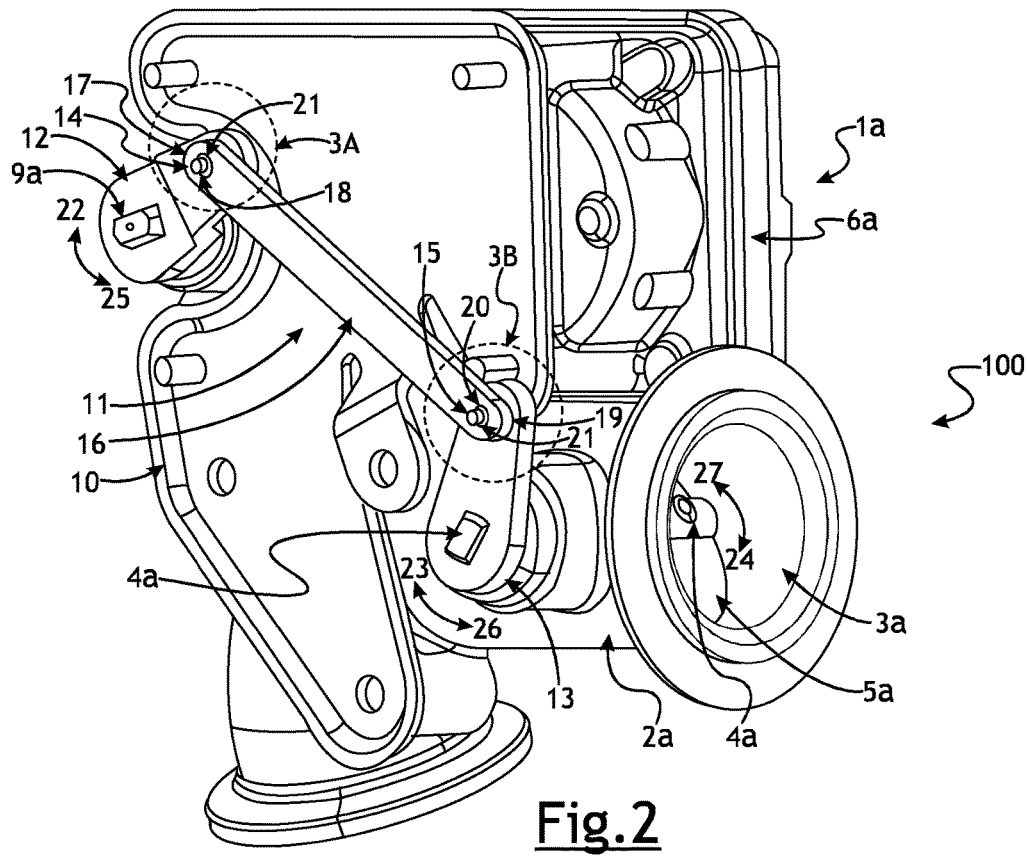
Fig.2
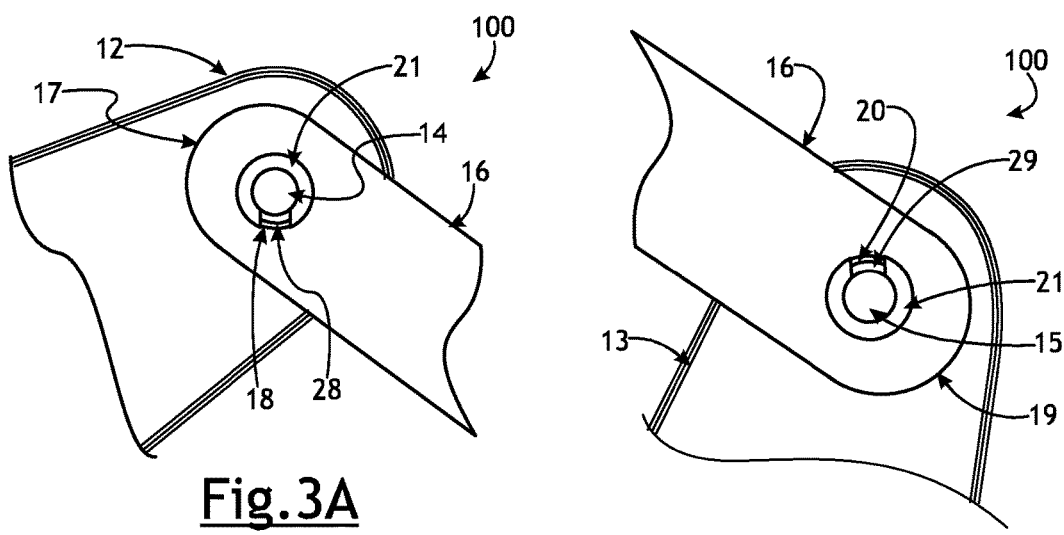
Fig.3A
Fig.3B

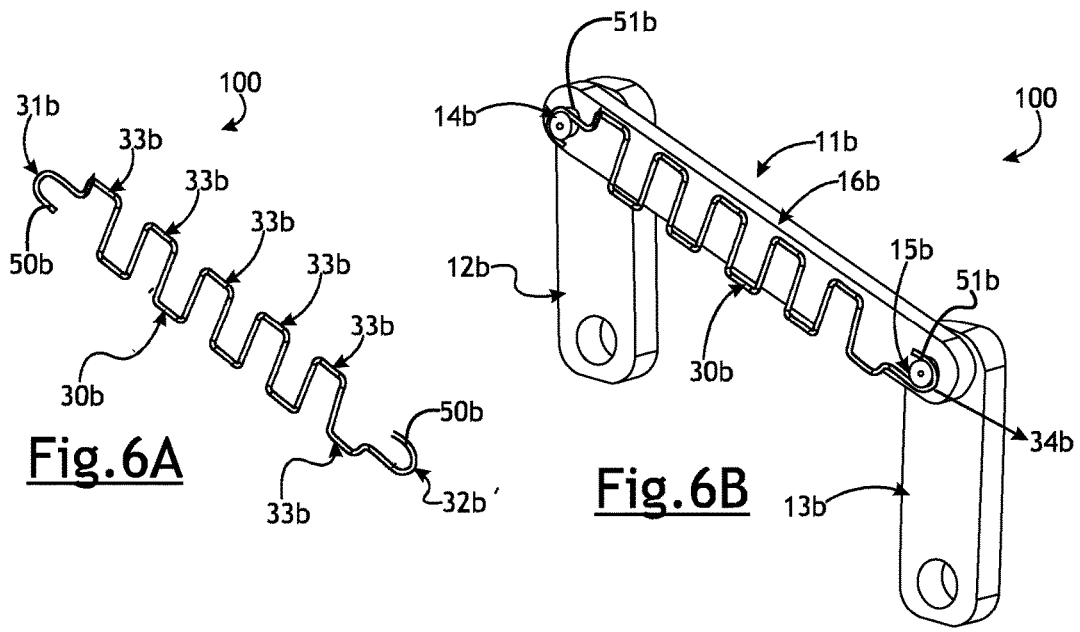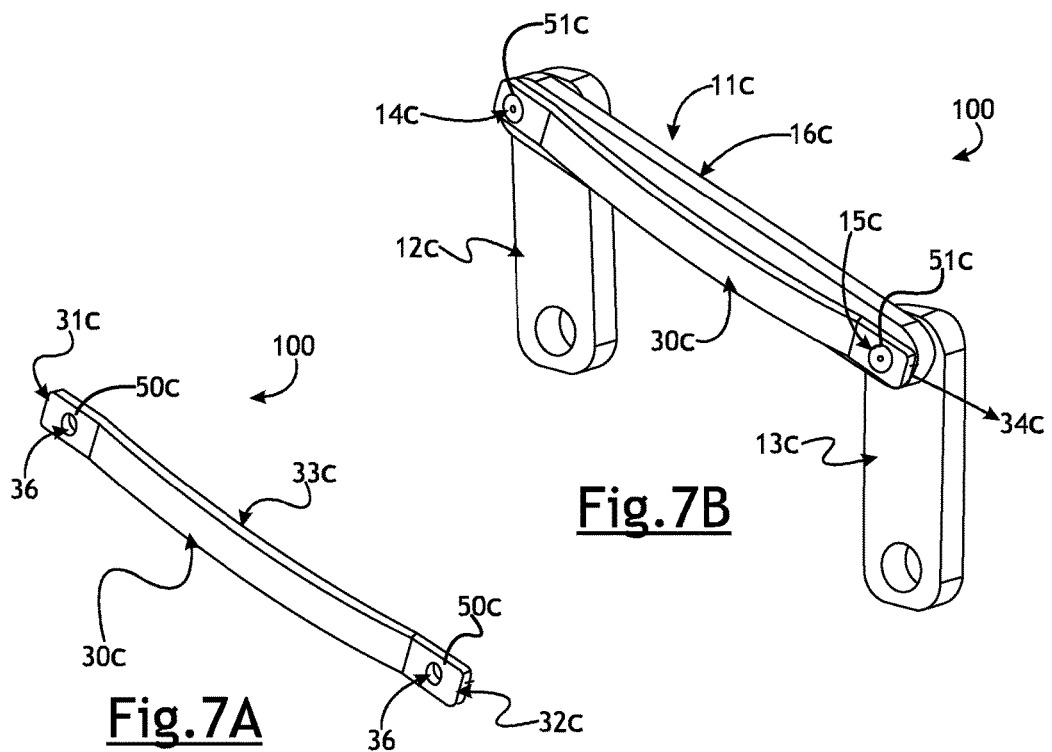

BIASING DEVICE FOR LINKAGE SYSTEM AND METHOD OF MAKING AND USING THE SAME

CROSS-REFERENCE TO RELATED APPLICATIONS

This application claims the benefit of U.S. Provisional Application No. 62/336,097, filed May 13, 2016.

TECHNICAL FIELD

The field to which the disclosure generally relates to includes biasing devices for linkage systems and methods of making and using the same.

BACKGROUND

In a number of variations, a linkage system may be used to mechanically couple two components of a machine or tool including, but not limited to, machines or tools used in vehicles.

SUMMARY OF ILLUSTRATIVE VARIATIONS

A number of variations may include product comprising: a linkage system comprising: a first and second lever; a first interconnecting component and second interconnecting component operably connected to the first and second levers; a link bar having a first end with a first opening for receiving the first or second interconnecting component, and providing a clearance between the first opening and the first or second interconnecting component and; a second end with a second opening for receiving the first or second interconnecting component and providing a clearance between the second opening and the first or second interconnecting component; and a biasing device having a first and second end for engagement with the first and second interconnecting components and at least one section to allow for increasing or decreasing its length, wherein when the first or second end of the biasing device is engaged with one of the first or second interconnecting component and an external force is applied to one of the first or second ends of the biasing device to cause the biasing device to either increase or decrease in length to allow engagement with one of the first or second interconnecting component and to store energy, and wherein when the external force is removed from the biasing device, the stored energy of the biasing device provide a force that causes the first and second interconnecting components to move in a direction that overcomes the clearances between the first and second interconnecting components and the first and second openings of the link bar and provides contact between the first and second interconnecting components and the first and second openings of the link bar and wherein the contact is maintained by the force provided by the stored energy.

A number of variations may include product comprising: an actuator and valve assembly comprising: an actuator having a shaft for providing rotation; a valve comprising: a valve body including a bore for receiving and delivering a fluid, a rotatable valve shaft supported in the valve body, a valve plate located within the bore and attached to the rotatable valve shaft for rotation between a valve open and valve closed position; and a linkage system with a biasing device comprising: a first lever operably connected to the rotatable shaft of the actuator, and a second lever operably connected to the rotatable valve shaft; a first interconnecting component operably connected to the first lever, and second interconnecting component operably connected to the second lever; a link bar having a first end with a first opening for receiving the first or second interconnecting component, and providing a clearance between the first opening and the first or second interconnecting component and a second end with a second opening for receiving the first or second interconnecting component and providing a clearance between the second opening and the first or second interconnecting component; a biasing device having a first and second end for engagement with at least one of the first and second interconnecting components, and at least one section to allow for increasing or decreasing its length; and wherein when at least one of the first or second end of the biasing device is engaged with one of the first or second interconnecting component and an external force is applied to one of the first or second ends of the biasing device the external force causes the biasing device to either increase or decrease in length to allow engagement with one of the first or second interconnecting component and to store energy, and wherein when the external force is removed from the biasing device, the stored energy of the biasing device provides a force that causes the first and second interconnecting components to move in a direction that overcomes the clearances between the first and second interconnecting components and the first and second openings of the link bar and provides contact between the first and second interconnecting components and the first and second openings of the link bar, and wherein the contact is maintained by the force provided by the stored energy, and wherein when the output shaft is rotated and movement is translated to the linkage assembly, with biasing device and the valve shaft, the valve plate moves without interrupted movement, and wherein when the output shaft is held in a fixed position and an external force is applied to the valve plate, the valve plate will not move.

A number of variations may include product comprising: a linkage system comprising: a first lever and a first interconnecting component operably connected to the first lever; a second lever and a second interconnecting component operably connected to the second lever; a link bar having a first end with a first opening for receiving the first or second interconnecting component and providing a clearance between the first opening and the first or second interconnecting component and a second end with a second opening for receiving the first or second interconnecting component and providing a clearance between the second opening and the first or second interconnecting component; and a biasing device having a first end for engagement with the first interconnecting component, a second end for engagement with the second interconnecting component, and at least one section to allow for increasing or decreasing its length wherein the biasing device is constructed and arranged to cause the first or second interconnecting components to move in a direction that will overcome the clearance between the first opening and the second opening and the first interconnecting component and the second interconnecting component and provide contact between the first and second interconnecting components and the first and second openings of the link bar when a force is applied.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 2 illustrates a product according to a number of variations.

FIG. 3A illustrates a product according to a number of variations.

FIG. 3B illustrates a product according to a number of variations.

FIG. 6A illustrates a product according to a number of variations.

FIG. 6B illustrates a product according to a number of variations.

FIG. 7A illustrates a product according to a number of variations.

FIG. 7B illustrates a product according to a number of variations.

DETAILED DESCRIPTION OF ILLUSTRATIVE VARIATIONS

The following description of the variations is merely illustrative in nature and is in no way intended to limit the scope of the invention, its application, or uses.

Figure 1:
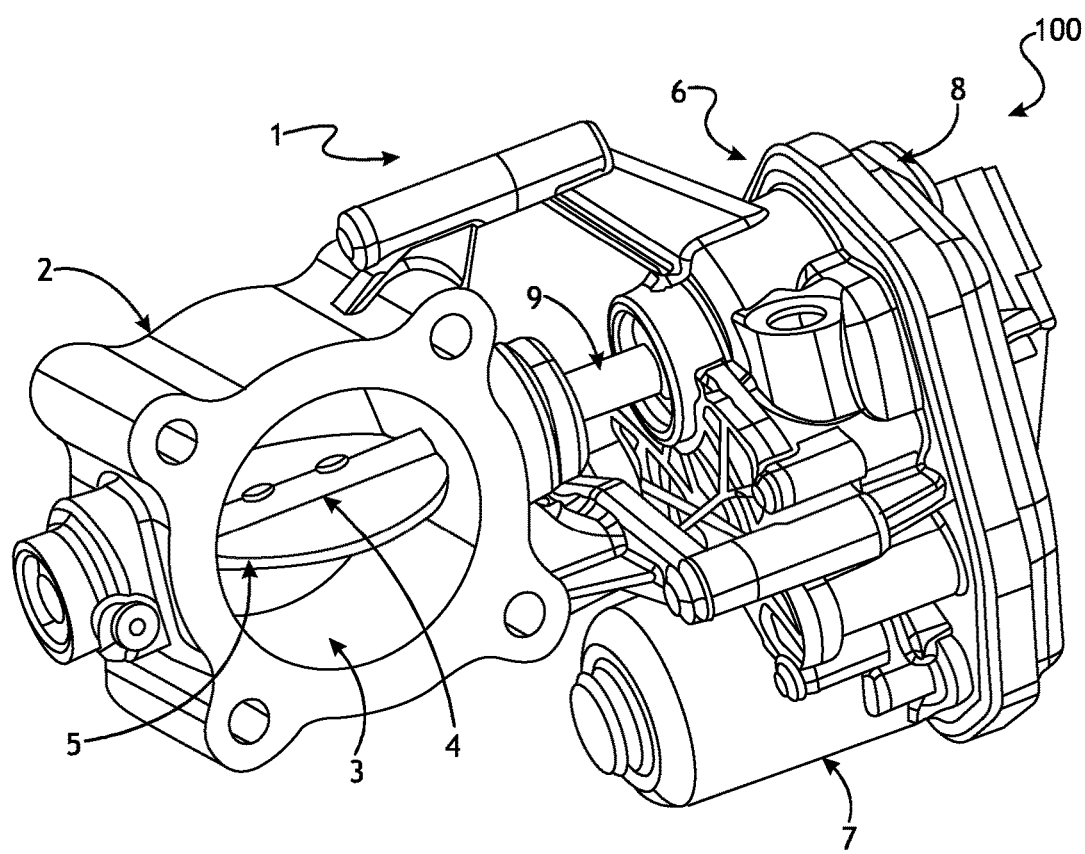
FIG. 1 illustrates a product according to a number of variations.

FIG. 1 illustrates a product 100 according to a number of variations. In a number of variations, the product 100 may include a vehicle component. In a number of variations, the vehicle may be an automobile. In a number of variations, the product 100 may include a turbocharger. In a number of variations, the product 100 may include a valve 1 or valve assembly 1. In a number of variations, the valve 1 may be used for controlling functions of an internal combustion engine. In a number of variations, the valve 1 may perform functions that may include intake air control and exhaust gas flow control. In a number of variations, the valve 1 that may be used may include at least one of flap style valves, poppet valves, throttle valves, bimetallic valves, spool valves, three-way check valves, three-way ball check valves, ball valves, gate valves, choke valves, pinch valves, needle valves, pressure reducing valves, or may be another type. In a number of variations, the product 100 or valve 1 may include a number of different components not shown but are used in common valves and may include detail not shown in the Figures. FIG. 1 shows a valve 1 for controlling exhaust flow according to a number of variations. In a number of variations, the valve 1 may include a valve housing 2 having a bore 3 for receiving and delivering exhaust gas. In a number of variations, a valve shaft 4 may pass through the bore 3 and may be supported by the valve housing 2 for rotation about its axis. In a number of variations, a valve plate 5 may be attached to the shaft 4 and may rotate with the valve shaft 4 to control the opening and closing of the throttle valve 1 and the flow of exhaust gas through the throttle valve 1.

In a number of variations, the product 100 may include an actuator 6 which may be used to rotate and position the valve shaft 4. In a number of variations, the actuator 6 may be one of a variety that may include pneumatic, hydraulic, electric, or may be another type. In a number of variations, the actuator 6 may have a housing 7 that may contain an electric motor and may contain associated gear drive system. In a number of variations, the actuator may include a cover 8 which may enclose the housing 7 and may include electrical connections to provide power and control for the actuator 6. In a number of variations, the actuator 6 may have a rotatable output shaft 9 that may extend from the housing 7. In a number of variations, for some applications, it may be desirable to couple the output shaft 9 directly to the valve shaft 4. In a number of variations, applications may require the actuator 6 to be remotely located from the valve housing 2. In a number of variations the remote location of actuator 6 may be desired because of space, high local temperature, or a need for a high mechanical advantage.

It may be noted in the following Figures that similar components may be identified using a similar numeral followed by a lower case letter. In a number of variations, FIG. 2 and FIGS. 3A and 3B show a valve assembly 1a where the actuator 6a is moved away from the valve housing 2a. In a number of variations, the valve shaft 4a and the output shaft 9a may not be coaxial and they may be offset by a distance and mounted to a bracket 10. In a number of variations, the product 100 may include a linkage system 11. In a number of variations, to facilitate an operative connection between the output shaft 9a and the valve shaft 4a, a linkage system 11 may be used. In a number of variations, the linkage system 11 may include a first lever 12 which may be attached to the output shaft 9a. In a number of variations, the linkage system 11 may include a second lever 13 which may be attached to the valve shaft 4a. In a number of variations, the linkage system 11 may include a first interconnecting component 14 which may be attached to the first lever 12. In a number of variations, the linkage system 11 may include a second interconnecting component 15 which may be attached to the second lever 13. In a number of variations, at least one of the interconnecting components 14, 15 may be a pin, threaded fastener, tube, bolt, nail, peg, ring, rivet, tie, or other suitable interconnecting component. In a number of variations, the linkage system 11 may include a link bar 16 which may be used to connect the first and second levers 12, 13. In a number of variations, the link bar 16 may have a first end 17 that may include a first opening 18, which may receive the first interconnecting component 14, and; a second end 19, having a second opening 20, which may receive the second interconnecting component 15. In a number of variations, the first and second interconnecting components 14, 15 may extend through the first and second openings 18, 20 of the link bar 16. FIGS. 3A and 3B illustrates enlarged views of portions of linkage system 11 viewed perpendicular to the faces of levers 12, 13 according to a number of variations. As shown in FIGS. 2, 3A and 3B, the link bar 16 may be retained by clips 21 attached to the first and second interconnecting components 14, 15.

In a number of variations, referring to FIG. 2, it may be noted that as the output shaft 9a is rotated in a first direction 22, the rotary motion of the output shaft 9a is translated to the linkage system 11 comprising the first lever 12, first interconnecting component 14, link bar 16, second interconnecting component 15, and second lever 13. In a number of variations, as the rotary motion of the output shaft 9a is translated to the linkage system 11 it may cause the second lever 13 to rotate the valve shaft 4a in a first direction 23 that may cause the valve plate 5a, located within bore 3a, to move in a valve closing direction 24. In a number of variations, it may also be seen that as the output shaft 9a is rotated in a second direction 25, the translated motion of the output shaft 9a to the linkage system 11 may cause the second lever 13 to move the valve shaft 4a in a second direction 26 that may cause the valve plate 5a to move in a valve opening direction 27.

In a number of variations, to allow movement of the linkage system 11, there may be a first clearance 28 between the first interconnecting component 14 and the first opening 18 of link bar 16. In a number of variations, to allow movement of the linkage system 11, there may be a second clearance 29 between the second interconnecting component 15 and second opening 20 of link bar 16. In a number of variations, the clearances 28, 29 may cause undesirable effects such as valve position error, valve position instability, lower durability, lost motion between the valve shaft 4a and the output shaft 9a, or other undesirable issues. In a number of variations, a first issue that may be noted is valve plate movement in the first and second directions 24, 27 may not occur until the output shaft 9a rotates sufficiently to overcome the first and second clearances 28, 29 and there is physical contact between first and second interconnecting components 14, 15 and first and second openings 18, 20 of link bar 16. In a number of variations, if a valve position sensor is monitoring the position of output shaft 9a, there may be a range of potential valve position error related to the first and second clearances 28, 29 since the valve plate 5a may not move until the clearances 28, 29 are overcome. In a number of variations, a second issue may be noted when output shaft 9a may be held in a fixed position. In a number of variations, valve plate 5a may be forcibly moved in the valve closing and opening directions 24, 27 until the first and second clearances 28, 29 are overcome and there is physical contact between first and second interconnecting components 14, 15 and first and second openings 18, 20 of link bar 16. In a number of variations, this movement of valve plate 5a without movement of output shaft 9a may result in an unstable valve plate 5a position if an exhaust system pressure or another external force is exerted on the valve plate 5a. In a number of variations, pressure pulsations in the exhaust system may cause the valve plate 5a to dither and may cause rapid motion and contact between the interconnecting components 14, 15 and first and second opening 18, 20 of link bar 16. In a number of variations, the rapid movement and contact may cause excessive wear or other undesirable condition that may affect durability or performance.

In a number of variations, the first and second clearances 28, 29 may be reduced by the use of a clearance reducing component such as, but not limited to, a bushing (not shown), a bearing (not shown), a ball-in-socket arrangement, or other component to reduce the clearance. In a number of variations, the clearance reducing component may be operably connected to the link bar 16 and form at least a portion of first and second openings 18, 20 of the link bar 16. In a number of variations, reducing clearances 28, 29 may minimize undesirable conditions; however, some clearance may still be required to allow movement. In a number of variations, one potential outcome may be to provide a bias to each interconnection that may force contact and minimize the clearance, but providing bias to each interconnection may be expensive and difficult to package. In a number of variations, the linkage system 11 may provide simultaneous biasing of each interconnection.

Figure 4:
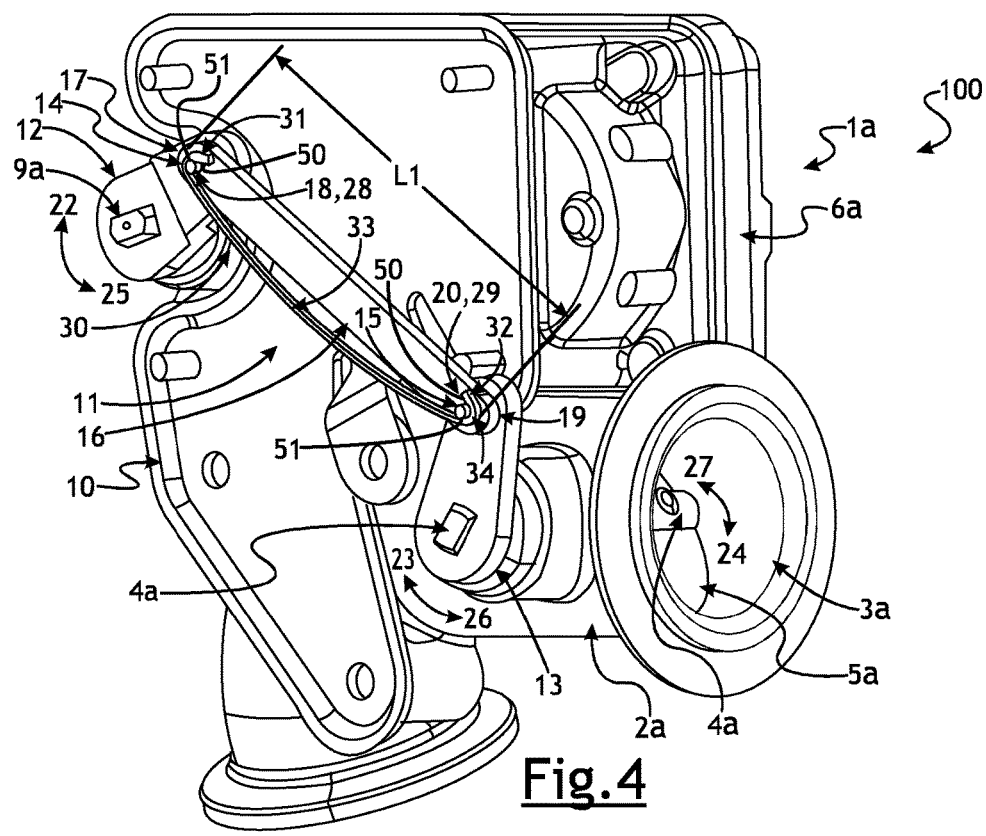
FIG. 4 illustrates a product according to a number of variations.

FIG. 4 illustrates, according to a number of variations, a product 100 comprising a valve assembly 1a comprising a biasing device 30, which may be attached to linkage system 11. In a number of variations, biasing device 30 may have a length $L_1$ and may have a first end 31 and a second end 32 that may be formed to engage with first and second interconnecting components 14, 15. In a number of variations, as shown in FIG. 4, the first and second ends 31, 32 of biasing device 30 may include at least one feature for engagement 50 with at least one of the interconnecting components 14, 15. In a number of variations, the feature for engagement 50 may be formed as hooks and may engage the first and second interconnecting components 14, 15 on an existing surface, or they may engage in a groove, a hole, plateau, or another suitable engagement feature. In a number of variations, as shown in FIG. 7A-7B, the feature for engagement 50 may be formed as circular openings 36 and may engage the first and second interconnecting components 14, 15 on an existing surface, or they may engage in a groove, a hole, plateau, or another suitable engagement feature. In a number of variations, the biasing device 30 may also have a least one formed section 33, between the first and second ends 31, 32. In a number of variations, the formed section 33 may comprise at least one section to allow for increasing or decreasing the length of the biasing device 30. In a number of variations, the formed section 33 may be offset from at least one point of engagement 51 of the first and second end 31, 32 of the biasing device 30 with at least one of the interconnecting components 14, 15.

In a number of variations, the formed section 33 may take the shape of, or may at least partially include a shape of a bend, arc, curve, oval, circular, square, rectangular, corrugation, arch, helical coil, or other suitable form that may allow for movement of the first and second ends 31, 32 to increase or decrease the length $L_1$ when an external force is applied to the biasing device 30. In a number of variations, as a non-limiting example, referring to FIG. 4, the first end 31 of biasing device 30 may be engaged with the first interconnecting component 14. In a number of variations, an external force may be applied to the biasing device 30 that may cause second end 32 to move in the direction of arrow 34 and increase the length $L_1$ of biasing device 30. In a number of variations, the formed section 33, shaped in this non-limiting example as an arch, may allow biasing device 30 to increase the length $L_1$ when the force is applied. In a number of variations, with sufficient external force, it may increase the length $L_1$ of biasing device 30 sufficiently to allow engagement of the second end 32 with the second interconnecting component 15. In a number of variations, as an external force may increase the length $L_1$ of the biasing device 30, energy may be stored in the biasing device 30 and, when the external force is removed from the biasing device 30, the stored energy of the biasing device 30 may provide a force that may cause interconnecting components 14, 15 to move towards each other, however, once the clearances 28, 29 are overcome, the interconnecting components 14, 15 may contact the link bar 16 within the first and second openings 18, 20. In a number of variations, the length $L_1$ of biasing device 30 may be selected to provide a stored energy that maybe sufficient to maintain contact between interconnecting components 14, 15 and openings 18, 20 of link bar 16, when the external force is removed. In a number of variations, the stored energy may maintain contact between the interconnecting components 14, 15 and openings 18, 20 of link bar 16 as the levers 12, 13 are rotated either by output shaft 9a or valve shaft 4a. The undesirable effects of clearance 28, 29 may be minimized or overcome by biasing device 30 and the desired operation of the linkage system 11 may be provided such that when the output shaft 9A is rotated and movement is translated to the linkage system 11, with biasing device 30, and the valve shaft 4a; the valve plate 5a may move, without interrupted movement and with lessened lost motion and; wherein when the output shaft 9a is held in a fixed position and an external force is applied to the valve plate 5a, the valve plate 5a may not move. In a number of variations, the biasing device 30 or any of the biasing device 30 components (first end 31, second end 32, formed section 33, or may be another component) may be made of a plastic or polymeric material, metal material, ceramic material, composite material, or any material conventionally used for constructing biasing devices in linkage systems.

Figures 5A, 5B:
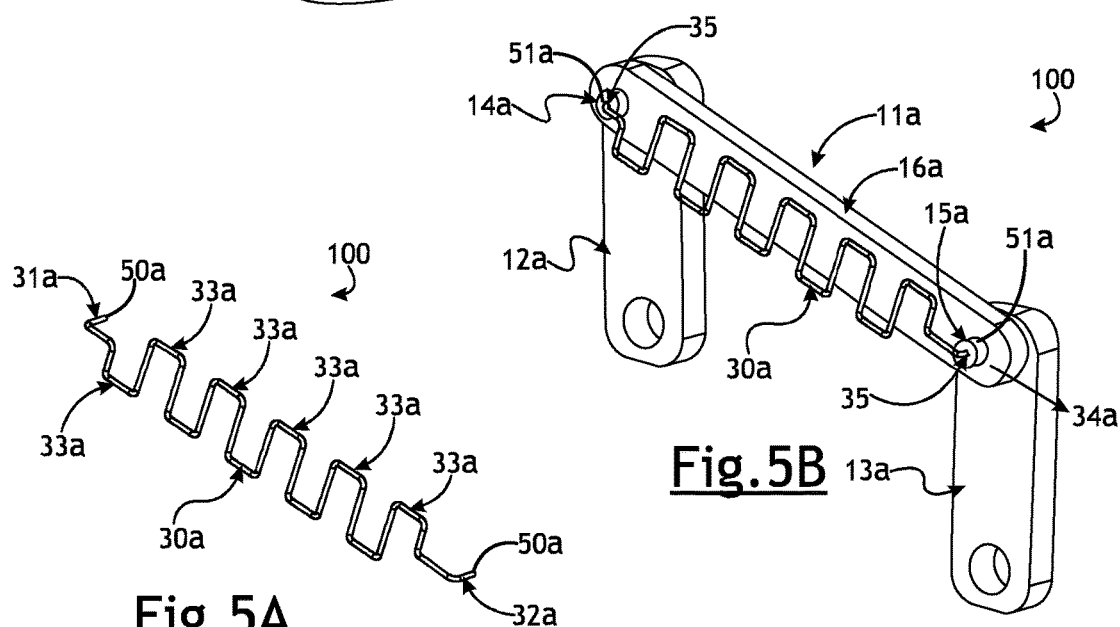
FIG. 5A illustrates a product according to a number of variations.
FIG. 5B illustrates a product according to a number of variations.
Figure 8A:
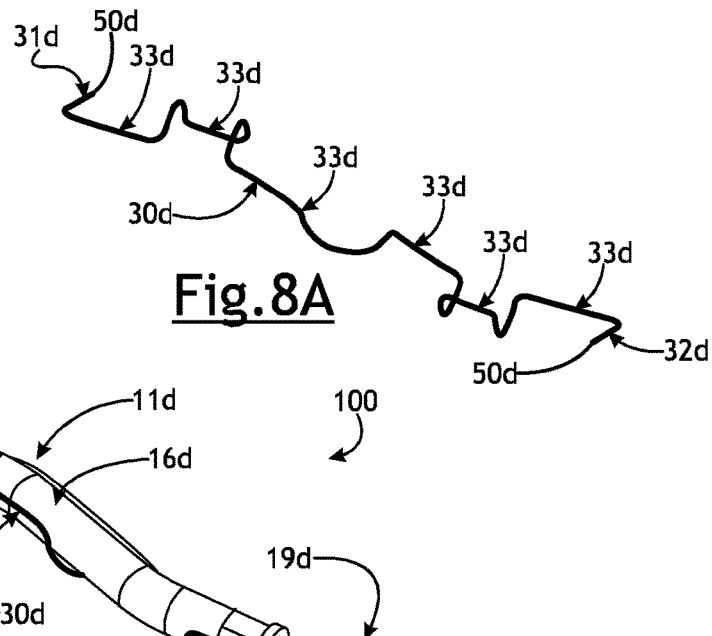
FIG. 8A illustrates a product according to a number of variations.
Figure 8B:
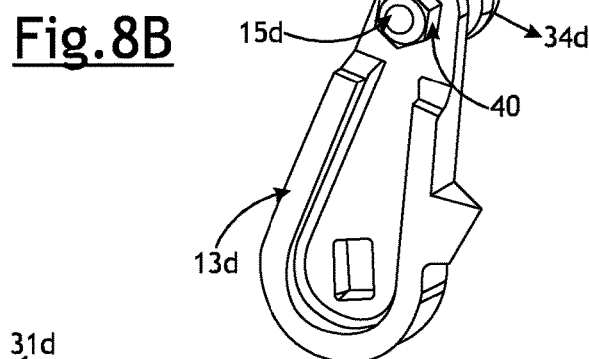
FIG. 8B illustrates a product according to a number of variations.
Figure 8C:
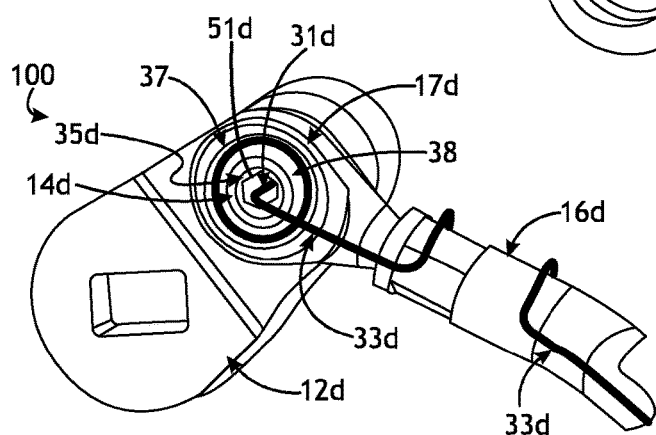
FIG. 8C illustrates a product according to a number of variations.
Figure 8D:
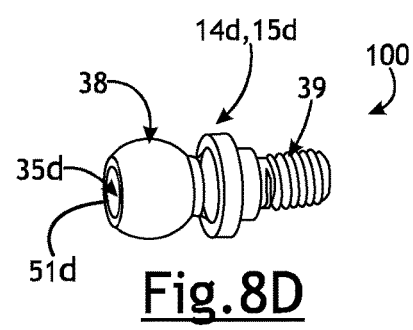
FIG. 8D illustrates a product according to a number of variations.

The biasing device 30 may have several variations. In a number of variations, in a non-limiting example shown in FIG. 4, the biasing device 30 may be formed from a rod having a round, oval, square, rectangular, polygonal, or may be another type cross-sectional shape. In a number of variations, the biasing device 30 may be in different forms. A biasing device 30a is shown in FIGS. 5A and 5B, according to a number of variations. In a number of variations, biasing device 30a may be formed from a round or oval rod as shown in linkage system 11a. In a number of variations, the linkage system 11a may comprise a first lever 12a, first interconnecting component 14a, link bar 16a, second interconnecting component 15a, and second lever 13a. In a number of variations, the biasing device 30a may be formed with a 90° bend on first and second ends 31a, 32a that may engage within the recesses 35 in first and second interconnecting component 14a, 15a. In a number of variations, Biasing device 30a may also have several formed sections 33a between the first and second ends 31a, 32a that may allow for movement of the first and second ends 31a, 32a when an external force is applied in a direction 34a. In a number of variations, the biasing device 30a may function in a similar manner as previously described for biasing device 30.

FIGS. 6A and 6B show a linkage system 11b with a biasing device 30b according to a number of variations. In a number of variations, linkage system 11b may comprise a first lever 12b, first interconnecting component 14b, link bar 16b, second interconnecting component 15b, and second lever 13b. In a number of variations, biasing device 30b may be similar to biasing device 30a and may be formed from a round or oval rod. Biasing device 30b has first and second ends 31b, 32b that may be formed as hooks and may engage the first and second interconnecting components 14b, 15b. In a number of variations, biasing device 30b may also have several formed sections 33b between the first and second ends 31b, 32b to allow for movement of the first and second ends 31b, 32b when an external force is applied in a direction 34b. In a number of variations, the biasing device 30b may function in a similar manner as previously described for biasing device 30 or 30a.

FIGS. 7A and 7B show a linkage system 11c with a biasing device 30c according to a number of variations. In a number of variations, linkage system 11c may comprise a first lever 12c, first interconnecting component 14c, link bar 16c, second interconnecting component 15c, and second lever 13c. In a number of variations, biasing device 30c may be formed from a flat sheet. In a number of variations, biasing device 30c may have first and second end 31c, 32c with openings 36 that may engage with first and second interconnecting components 14c and 15c. In a number of variations, biasing device 30c may also have a formed section 33c between the first and second ends 31c, 32c to allow for movement of the first and second ends 31c, 32c when an external force is applied in direction 34c. In a number of variations, formed section 33c may be shaped as an arch extending between the first and second ends 31c, 32c. In a number of variations, biasing device 30c may function in a similar manner as previously described for biasing device 30, 30a, or 30b.

FIGS. 8A-8D show multiple views of a linkage system 11d with a biasing device 30d according to a number of variations. In a number of variations, the linkage assembly 11d may have a link bar 16d that has at least one offset. In a number of variations, this type of linkage system may be required when an actuator 6 and valve housing 2 may be in an orientation that may not allow the use of a straight link bar. In a number of variations, biasing device 30d may be formed from a round or oval rod. In a number of variations, linkage system 11d may comprise a first lever 12d, first interconnecting component 14d, link bar 16d, second interconnecting component 15d, and second lever 13d. In a number of variations, biasing device 30d may be form with a 90° bend on first and second ends 31d, 32d that engage within recesses 35d in first and second interconnecting component 14d, 15d. In a number of variations, biasing device 30d may also have several formed sections 33d between the first and second ends 31d, 32d to allow for movement of the first and second ends 31d, 32d when an external force is applied in a direction 34d. In a number of variations, biasing device 30d may function in a similar manner as previously described for biasing device 30, 30a, 30b, or 30c. Referring again to FIGS. 8A-8D, in a number of variations, the several formed sections 33d may also serve to attach biasing device 30d to link bar 16d. In a number of variations, the retention provided by the formed sections 33d may help secure biasing device 30d to link bar 16d when external forces, such as vibration and physical shock may be imposed on the linkage system.

FIGS. 8A-8D illustrate a ball-in-socket assembly on the first and second ends 17d, 19d of link bar 16d according to number of variations. In a number of variations, a socket 37 may be attached on the first and second ends 17d, 19d. In a number of variations, the socket 37 may have an opening that may receive and secure a ball 38 that may allow the socket 37 and link bar 16d to move in a multi-directional manner. In a number of variations, the ball 38 may be formed as a portion of the first and second interconnecting components 14d, 15d. In a number of variations, interconnecting components 14d, 15d may include the recess 35d and a threaded portion 39 that may be used to secure the interconnecting components 14d, 15d to the first and second levers 12d, 13d. In a number of variations, the recess 35d may also serve as a drive feature for threading the interconnecting components 14d, 15d into levers 12d, 13d or into securing nut 40. As previously noted, a small clearance may be required between the socket 37 and the ball 38, therefore, in a number of variations, the biasing device 30d may be needed to avoid the undesirable conditions cause by the clearance.

Figure 9A:
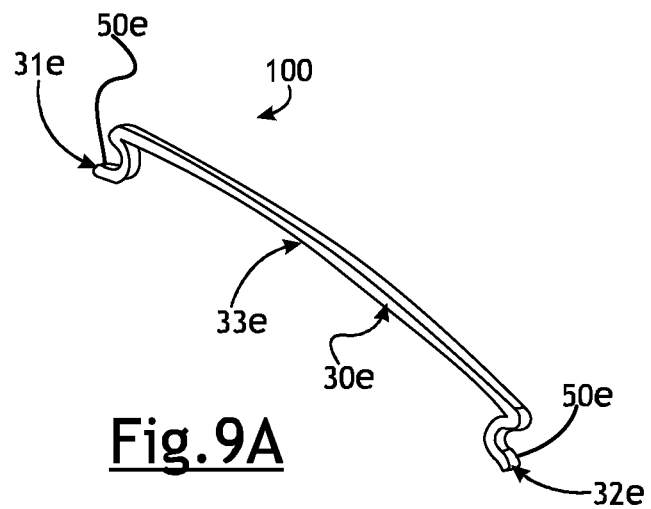
FIG. 9A illustrates a product according to a number of variations.
Figure 9B:
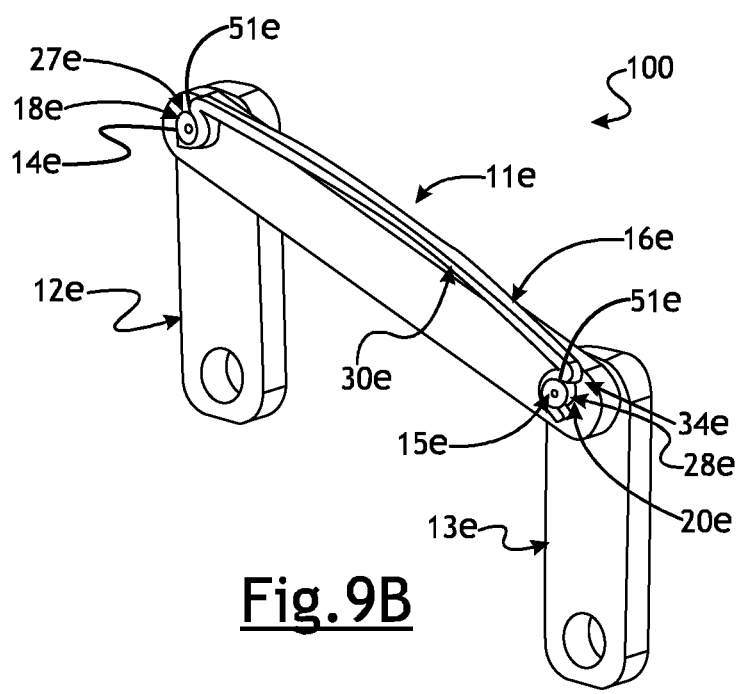
FIG. 9B illustrates a product according to a number of variations.

Referring again to FIG. 4 and the preceding description, a force may be applied to biasing device 30 to increase the length of the biasing device 30, in a direction 34, to allow engagement of the second end 32 of the biasing device 30 and the second interconnecting component 15. In a number of variations, the biasing device 30 may decrease in length to allow engagement of the biasing device 30 and interconnecting components 14, 15. FIGS. 9A and 9B show a linkage system 11e with biasing device 30e according to a number of variations. In a number of variations, linkage system 11e may comprise a first lever 12e, first interconnecting component 14e, link bar 16e, second interconnecting component 15e, and second lever 13e. In a number of variations, the first and second ends 31e, 32e of biasing device 30e may be formed as hooks for engagement with first and second interconnecting components 14e, 15e. In a number of variations, the first end 31e of biasing device 30e may be engaged with the first interconnecting component 14e. In a number of variations, an external force may be applied to the biasing device 30e that may cause second end 32e to move in the direction of arrow 34e and decrease the length of biasing device 30e. In a number of variations, the formed section 33e, shaped as an arch, may allow bias device 30e to decrease in length when the force is applied. In a number of variations, with sufficient external force it may decrease the length of biasing device 30e sufficiently to allow engagement of the second end 32e with the second interconnecting component 15e. In a number of variations, when the external force is removed, the stored energy may apply a force to first and second interconnecting components 14e, 15e and force them to move away from each other however, once the clearances 27e, 28e are overcome, the interconnecting components may contact the link bar 16e within the first and second openings 18e, 20e and contact may be maintained by the force applied by the stored energy in the bias device 30e. In a number of variations, biasing device 30e may provide similar functions and benefits as previously described for biasing device 30.

In a number of variations, a method may be shown. In a number of variations, the method may include providing a product 100 comprising first lever 12 and a first interconnecting component 14 operably connected to the first lever 12, a second lever 13 and a second interconnecting component 15 operably connected to the second lever 13, a link bar 16 having a first end 17 with a first opening 18 for receiving the first or second interconnecting component 14, 15 and a second end 19 with a second opening 20 for receiving the first or second interconnecting component 14, 15 wherein at least one of the first opening 18 or the second opening 20 provides a clearance 28, 29 between at least one of the first opening 18 or the second opening 19, and at least one of the first interconnecting component 14 or the second interconnecting component 15, and a biasing device 30 having a first end 31 for engagement with the first or second interconnecting component 14, 15, a second end 32 for engagement with the first or second interconnecting component 14, 15, and at least one section 33 to allow for increasing or decreasing its length $L_1$ wherein the biasing device 30 is constructed and arranged to cause at least one of the first or second interconnecting components 14, 15 to move in a direction that will overcome the clearance 28, 29 between at least one of the first opening 18 or the second opening 20 and at least one of the first interconnecting component 14 or the second interconnecting component 15 and provide contact between at least one of the first and second interconnecting components 14, 15 and at least one of the first and second openings 18, 20 of the link bar 16 when an external force is applied. In a number of variations, the method may include applying an external force to one of the first or second ends 31, 32 of the biasing device to cause the biasing device 30 to either increase or decrease in length $L_1$ to allow engagement with one of the first or second interconnecting component 14, 15 and to store energy. In a number of variations, the method may include removing the external force from the biasing device 30 so that the stored energy of the biasing device 30 provides a force that causes at least one of the first and second interconnecting components 14, 15 to move in a direction that overcomes at least one of the clearances 28, 29 between the first and second interconnecting components 14, 15 and the first and second openings 18, 20 of the link bar 16 and provides contact between at least one of the first and second interconnecting components 14, 15 and at least one of the first and second openings 18, 20 of the link bar 16 and wherein the contact is maintained by the force provided by the stored energy.

A number of variations may include a product comprising: a linkage system comprising: a first and second lever, a first interconnecting component and second interconnecting component operably connected to the first and second levers, a link bar having a first end with a first opening for receiving the first or second interconnecting component, a second end with a second opening for receiving the first or second interconnecting component and wherein at least one of the first opening or the second opening provides a clearance between at least one of the first opening or the second opening, and at least one of the first interconnecting component or the second interconnecting component, a biasing device having a first and second end for engagement with at least one of the first and second interconnecting components and at least one section to allow for increasing or decreasing its length, and wherein when at least one of the first or second end of the biasing device is engaged with one of the first or second interconnecting component and an external force is applied to one of the first or second ends of the biasing device, the external force causes the biasing device to either increase or decrease in length to allow engagement with one of the first or second interconnecting component and to store energy, and wherein when the external force is removed from the biasing device, the stored energy of the biasing device provides a force that causes at least one of the first and second interconnecting components to move in a direction that overcomes at least one of the clearances between the first and second interconnecting components and the first and second openings of the link bar and provides contact between at least one of the first and second interconnecting components and at least one of the first and second openings of the link bar and wherein the contact is maintained by the force provided by the stored energy.

A number of variations may include a product comprising: an actuator and valve assembly with a biasing device for a linkage system comprising: an actuator having a shaft for providing rotation, a valve comprising: a valve body including a bore for receiving and delivering a fluid, a rotatable valve shaft supported in the valve body, a valve plate located within the bore and attached to the rotatable valve shaft for rotation between a valve open and valve closed position, a linkage system with a biasing device comprising: a first lever operably connected to the rotatable shaft of the actuator, and a second lever operably connected to the rotatable valve shaft, a first interconnecting component operably connected to the first lever, and second interconnecting component operably connected to the second lever, a link bar having a first end with a first opening for receiving the first or second interconnecting component, a second end with a second opening for receiving the first or second interconnecting component and wherein at least one of the first opening or the second opening provides a clearance between at least one of the first opening or the second opening, and at least one of the first interconnecting component or the second interconnecting component, a biasing device having a first and second end for engagement with at least one of the first and second interconnecting components, and at least one section to allow for increasing or decreasing its length, and wherein when at least one of the first or second end of the biasing device is engaged with one of the first or second interconnecting component, and an external force is applied to one of the first or second ends of the biasing device the external force causes the biasing device to either increase or decrease in length to allow engagement with one of the first or second interconnecting component and to store energy, and wherein when the external force is removed from the biasing device, the stored energy of the biasing device provides a force that causes at least one of the first and second interconnecting components to move in a direction that overcomes at least one of the clearances between the first and second interconnecting components and the first and second openings of the link bar and provides contact between at least one of the first and second interconnecting components and at least one of the first and second openings of the link bar, and wherein the contact is maintained by the force provided by the stored energy, and wherein when the output shaft is rotated and movement is translated to the linkage assembly, with biasing device, and the valve shaft, the valve plate moves without interrupted movement, and wherein when the output shaft is held in a fixed position and an external force is applied to the valve plate, the valve plate will not move.

A number of variations may include a product comprising: a linkage system comprising: a first lever and a first interconnecting component operably connected to the first lever, a second lever and a second interconnecting component operably connected to the second lever, a link bar having a first end with a first opening for receiving the first or second interconnecting component and a second end with a second opening for receiving the first or second interconnecting component wherein at least one of the first opening or the second opening provides a clearance between at least one of the first opening or the second opening, and at least one of the first interconnecting component or the second interconnecting component, and a biasing device having a first end for engagement with the first and interconnecting component, a second end for engagement with the second interconnecting component, and at least one section to allow for increasing or decreasing its length wherein the biasing device is constructed and arranged to cause at least one of the first or second interconnecting components to move in a direction that will overcome the clearance between at least one of the first opening or the second opening and at least one of the first interconnecting component or the second interconnecting component and provide contact between at least one of the first and second interconnecting components and at least one of the first and second openings of the link bar when an external force is applied.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product comprising: a linkage system comprising: a first and second lever; a first interconnecting component and second interconnecting component operably connected to the first and second levers; a link bar having a first end with a first opening for receiving the first or second interconnecting component, and providing a clearance between the first opening and the first or second interconnecting component and; a second end with a second opening for receiving the first or second interconnecting component and providing a clearance between the second opening and the first or second interconnecting component; and a biasing device having a first and second end for engagement with the first and second interconnecting components and at least one section to allow for increasing or decreasing its length, wherein when the first or second end of the biasing device is engaged with one of the first or second interconnecting component and an external force is applied to one of the first or second ends of the biasing device to cause the biasing device to either increase or decrease in length to allow engagement with one of the first or second interconnecting component and to store energy, and wherein when the external force is removed from the biasing device, the stored energy of the biasing device provide a force that causes the first and second interconnecting components to move in a direction that overcomes the clearances between the first and second interconnecting components and the first and second openings of the link bar and provides contact between the first and second interconnecting components and the first and second openings of the link bar and wherein the contact is maintained by the force provided by the stored energy.

Variation 2 may include a product as set forth in Variation 1, wherein at least one of the first or second end of the biasing device comprises a feature for engagement with at least one of the interconnecting components.

Variation 3 may include a product as set forth in Variation 2 wherein the feature on first or second end of the biasing device comprises a hook for engagement with the interconnecting component.

Variation 4 may include a product as set forth in Variations 2-3 wherein the feature on first or second end of the biasing device comprises a circular opening for engagement with the interconnecting component.

Variation 5 may include a product as set forth in any of Variations 1-4 wherein the at least one section to allow for increasing or decreasing its length is offset from the points of engagement of the first and second end of the biasing device with the interconnecting components.

Variation 6 may include a product as set forth in any of Variations 1-5 wherein the at least one section to allow for increasing or decreasing its length comprises an arc or curved shape.

Variation 7 may include a product as set forth in any of Variations 1-6 wherein the at least one section to allow for increasing or decreasing its length comprises an oval or circular shape.

Variation 8 may include a product as set forth in any of Variations 1-7 wherein the at least one section to allow for increasing or decreasing its length comprises a square or rectangular shape.

Variation 9 may include a product as set forth in any of Variations 1-8 wherein the at least one section to allow for increasing or decreasing its length comprises a helical shape.

Variation 10 may include a product as set forth in any of Variations 1-9 wherein the biasing device comprises a round, oval, square, polygonal, or rectangular rod cross-section.

Variation 11 may include a product as set forth in any of Variations 1-10 wherein the biasing device comprises a flat sheet.

Variation 12 may include a product as set forth in any of Variations 1-11, wherein the biasing device attaches to the link bar by at least one formed section between the first and second ends.

Variation 13 may include a product as set forth in any of Variations 1-12 wherein at least one of the interconnecting components is a pin, cylindrical tube, or a threaded fastener.

Variation 14 may include a product as set forth in any of Variations 1-13 wherein the link bar further comprises at least one of a bushing, a bearing, or ball-in-socket and wherein the bushing, the bearing, or the ball-in-socket forms at least a portion the first or second opening in the first or second end of the link bar.

Variation 15 may include a product comprising: an actuator and valve assembly comprising: an actuator having a shaft for providing rotation; a valve comprising: a valve body including a bore for receiving and delivering a fluid, a rotatable valve shaft supported in the valve body, a valve plate located within the bore and attached to the rotatable valve shaft for rotation between a valve open and valve closed position; and a linkage system with a biasing device comprising: a first lever operably connected to the rotatable shaft of the actuator, and a second lever operably connected to the rotatable valve shaft; a first interconnecting component operably connected to the first lever, and second interconnecting component operably connected to the second lever; a link bar having a first end with a first opening for receiving the first or second interconnecting component, and providing a clearance between the first opening and the first or second interconnecting component and a second end with a second opening for receiving the first or second interconnecting component and providing a clearance between the second opening and the first or second interconnecting component; a biasing device having a first and second end for engagement with at least one of the first and second interconnecting components, and at least one section to allow for increasing or decreasing its length; and wherein when at least one of the first or second end of the biasing device is engaged with one of the first or second interconnecting component and an external force is applied to one of the first or second ends of the biasing device the external force causes the biasing device to either increase or decrease in length to allow engagement with one of the first or second interconnecting component and to store energy, and wherein when the external force is removed from the biasing device, the stored energy of the biasing device provides a force that causes the first and second interconnecting components to move in a direction that overcomes the clearances between the first and second interconnecting components and the first and second openings of the link bar and provides contact between the first and second interconnecting components and the first and second openings of the link bar, and wherein the contact is maintained by the force provided by the stored energy, and wherein when the output shaft is rotated and movement is translated to the linkage assembly, with biasing device and the valve shaft, the valve plate moves without interrupted movement, and wherein when the output shaft is held in a fixed position and an external force is applied to the valve plate, the valve plate will not move.

Variation 16 may include a product comprising: a linkage system comprising: a linkage system comprising: a first lever and a first interconnecting component operably connected to the first lever; a second lever and a second interconnecting component operably connected to the second lever; a link bar having a first end with a first opening for receiving the first or second interconnecting component and providing a clearance between the first opening and the first or second interconnecting component and a second end with a second opening for receiving the first or second interconnecting component and providing a clearance between the second opening and the first or second interconnecting component; and a biasing device having a first end for engagement with the first interconnecting component, a second end for engagement with the second interconnecting component, and at least one section to allow for increasing or decreasing its length wherein the biasing device is constructed and arranged to cause the first or second interconnecting components to move in a direction that will overcome the clearance between the first opening and the second opening and the first interconnecting component and the second interconnecting component and provide contact between the first and second interconnecting components and the first and second openings of the link bar when a force is applied.

Variation 17 may include a product as set forth in any of Variation 16 wherein at least one of the first or second end of the biasing device comprises a feature for engagement with at least one of the interconnecting components comprising a hook or circular opening.

Variation 18 may include a product as set forth in any of Variations 16-17 wherein the at least one section to allow for increasing or decreasing its length is offset from at least one point of engagement of the first and second end of the biasing device with at least one of the interconnecting components.

Variation 19 may include a product as set forth in any of Variations 16-18 wherein the biasing device comprises a round, oval, square, polygonal, or rectangular rod cross-section.

Variation 20 may include a product as set forth in any of Variations 16-19 wherein at least one of the interconnecting components comprises a pin, cylindrical tube, or a threaded fastener.

Variation 21 may include a product comprising: a linkage system comprising: a first and second lever, a first interconnecting component and second interconnecting component operably connected to the first and second levers, a link bar having a first end with a first opening for receiving the first or second interconnecting component, a second end with a second opening for receiving the first or second interconnecting component and wherein at least one of the first opening or the second opening provides a clearance between at least one of the first opening or the second opening, and at least one of the first interconnecting component or the second interconnecting component, a biasing device having a first and second end for engagement with at least one of the first and second interconnecting components and at least one section to allow for increasing or decreasing its length, and wherein when at least one of the first or second end of the biasing device is engaged with one of the first or second interconnecting component and an external force is applied to one of the first or second ends of the biasing device, the external force causes the biasing device to either increase or decrease in length to allow engagement with one of the first or second interconnecting component and to store energy, and wherein when the external force is removed from the biasing device, the stored energy of the biasing device provides a force that causes at least one of the first and second interconnecting components to move in a direction that overcomes at least one of the clearances between the first and second interconnecting components and the first and second openings of the link bar and provides contact between at least one of the first and second interconnecting components and at least one of the first and second openings of the link bar and wherein the contact is maintained by the force provided by the stored energy.

Variation 22 may include a product comprising: an actuator and valve assembly with a biasing device for a linkage system comprising: an actuator having a shaft for providing rotation, a valve comprising: a valve body including a bore for receiving and delivering a fluid, a rotatable valve shaft supported in the valve body, a valve plate located within the bore and attached to the rotatable valve shaft for rotation between a valve open and valve closed position, a linkage system with a biasing device comprising: a first lever operably connected to the rotatable shaft of the actuator, and a second lever operably connected to the rotatable valve shaft, a first interconnecting component operably connected to the first lever, and second interconnecting component operably connected to the second lever, a link bar having a first end with a first opening for receiving the first or second interconnecting component, a second end with a second opening for receiving the first or second interconnecting component and wherein at least one of the first opening or the second opening provides a clearance between at least one of the first opening or the second opening, and at least one of the first interconnecting component or the second interconnecting component, a biasing device having a first and second end for engagement with at least one of the first and second interconnecting components, and at least one section to allow for increasing or decreasing its length, and wherein when at least one of the first or second end of the biasing device is engaged with one of the first or second interconnecting component, and an external force is applied to one of the first or second ends of the biasing device the external force causes the biasing device to either increase or decrease in length to allow engagement with one of the first or second interconnecting component and to store energy, and wherein when the external force is removed from the biasing device, the stored energy of the biasing device provides a force that causes at least one of the first and second interconnecting components to move in a direction that overcomes at least one of the clearances between the first and second interconnecting components and the first and second openings of the link bar and provides contact between at least one of the first and second interconnecting components and at least one of the first and second openings of the link bar, and wherein the contact is maintained by the force provided by the stored energy, and wherein when the output shaft is rotated and movement is translated to the linkage assembly, with biasing device, and the valve shaft, the valve plate moves without interrupted movement, and wherein when the output shaft is held in a fixed position and an external force is applied to the valve plate, the valve plate will not move.

Variation 23 may include a product comprising: a linkage system comprising: a first lever and a first interconnecting component operably connected to the first lever, a second lever and a second interconnecting component operably connected to the second lever, a link bar having a first end with a first opening for receiving the first or second interconnecting component and a second end with a second opening for receiving the first or second interconnecting component wherein at least one of the first opening or the second opening provides a clearance between at least one of the first opening or the second opening, and at least one of the first interconnecting component or the second interconnecting component, and a biasing device having a first end for engagement with the first and interconnecting component, a second end for engagement with the second interconnecting component, and at least one section to allow for increasing or decreasing its length wherein the biasing device is constructed and arranged to cause at least one of the first or second interconnecting components to move in a direction that will overcome the clearance between at least one of the first opening or the second opening and at least one of the first interconnecting component or the second interconnecting component and provide contact between at least one of the first and second interconnecting components and at least one of the first and second openings of the link bar when an external force is applied.

The above description of select variations within the scope of the invention is merely illustrative in nature and, thus, variations or variants thereof are not to be regarded as a departure from the spirit and scope of the invention.

What is claimed is:

1. A product comprising:
    a linkage system comprising:
    a first and second lever;
    a first interconnecting component and second interconnecting component operably connected to the first and second levers;
    a link bar having a first end with a first opening for receiving the first or second interconnecting component, and providing a clearance between the first opening and the first or second interconnecting component and; a second end with a second opening for receiving the first or second interconnecting component and providing a clearance between the second opening and the first or second interconnecting component;
    and a biasing device having a first and second end for engagement with the first and second interconnecting components and at least one section to allow for increasing or decreasing its length,
    wherein when the first or second end of the biasing device is engaged with one of the first or second interconnecting component and an external force is applied to one of the first or second ends of the biasing device to cause the biasing device to either increase or decrease in length to allow engagement with one of the first or second interconnecting component and to store energy, and
    wherein when the external force is removed from the biasing device, the stored energy of the biasing device provide a force that causes the first and second interconnecting components to move in a direction that overcomes the clearances between the first and second interconnecting components and the first and second openings of the link bar and provides contact between the first and second interconnecting components and the first and second openings of the link bar and wherein the contact is maintained by the force provided by the stored energy throughout rotation of the first and second lever.

2. The product of claim 1 wherein at least one of the first or second end of the biasing device comprises a feature for engagement with at least one of the first or the second interconnecting components.

3. The product of claim 2 wherein the feature on the first or second end of the biasing device comprises a hook for engagement with the first or the second interconnecting component.

4. The product of claim 2 wherein the feature on the first or second end of the biasing device comprises a circular opening for engagement with the first or the second interconnecting component.

5. The product of claim 1 wherein the at least one section to allow for increasing or decreasing its length is offset from the points of engagement of the first and second end of the biasing device with the first or the second interconnecting components.

6. The product of claim 1 wherein the at least one section to allow for increasing or decreasing its length comprises an arc or curved shape.

7. The product of claim 1 wherein the at least one section to allow for increasing or decreasing its length comprises an oval or circular shape.

8. The product of claim 1 wherein the at least one section to allow for increasing or decreasing its length comprises a square or rectangular shape.

9. The product of claim 1 wherein the at least one section to allow for increasing or decreasing its length comprises a helical shape.

10. The product of claim 1 wherein the biasing device comprises a round, oval, square, polygonal, or rectangular rod cross-section.

11. The product of claim 1 wherein the biasing device comprises a flat sheet.

12. The product of claim 1 wherein the biasing device attaches to the link bar by at least one formed section between the first and second ends.

13. The product of claim 1 wherein at least one of the first or the second interconnecting components is a pin, cylindrical tube, or a threaded fastener.

14. The product of claim 1 wherein the link bar further comprises at least one of a bushing, a bearing, or ball-in-socket and wherein the bushing, the bearing, or the ball-in-socket forms at least a portion of the first or second opening in the first or second end of the link bar.

15. The product of claim 1 wherein the external force is applied to the first or second ends of the biasing device to cause the biasing device to decrease in length to allow engagement with one of the first or second interconnecting component and to store energy; and wherein when the external force is removed from the biasing device, the stored energy of the biasing device provides the force that causes the first and second interconnecting components to move away from each other in a direction that overcomes the clearances between the first and second interconnecting components and the first and second openings of the link bar and provides contact between the first and second interconnecting components and the first and second openings of the link bar.

16. The product of claim 1 wherein when the biasing device is in a relaxed state, the at least one section to allow for increasing or decreasing the length of the biasing device is offset from points of engagement of the first and second end of the biasing device with the first and second interconnecting components.

17. A product comprising:
a linkage system comprising:
a first and second lever;
a first interconnecting component and second interconnecting component operably connected to the first and second levers;
a link bar having a first end with a first opening for receiving the first or second interconnecting component, and providing a clearance between the first opening and the first or second interconnecting component and; a second end with a second opening for receiving the first or second interconnecting component and providing a clearance between the second opening and the first or second interconnecting component;
and a biasing device having a first and second end for engagement with the first and second interconnecting components and at least one section to allow for increasing or decreasing its length,
wherein when the first or second end of the biasing device is engaged with one of the first or second interconnecting component and an external force is applied to one of the first or second ends of the biasing device to cause the biasing device to increase in length to allow engagement with one of the first or second interconnecting component and to store energy, and
wherein when the external force is removed from the biasing device, the stored energy of the biasing device provide a force that causes the first and second interconnecting components to move toward each other in a direction that overcomes the clearances between the first and second interconnecting components and the first and second openings of the link bar and provides contact between the first and second interconnecting components and the first and second openings of the link bar and wherein the contact is maintained by the force provided by the stored energy.

* * * * *